UNITED STATES PATENT OFFICE.

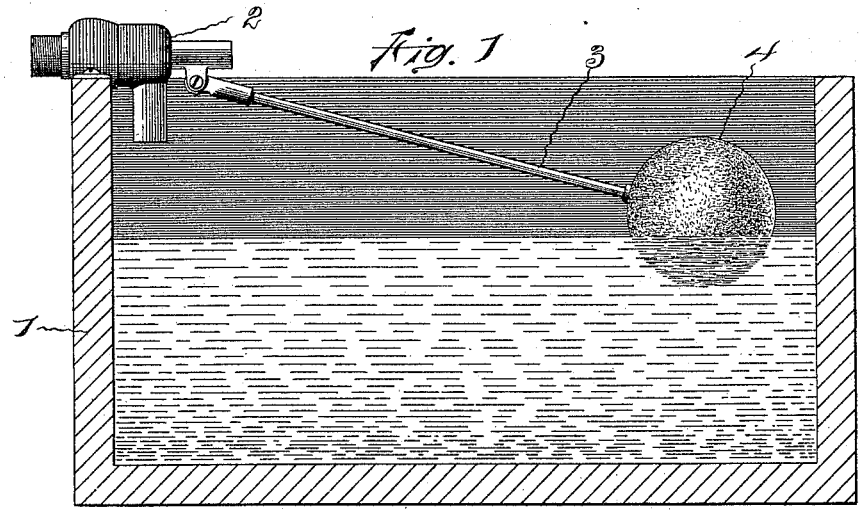
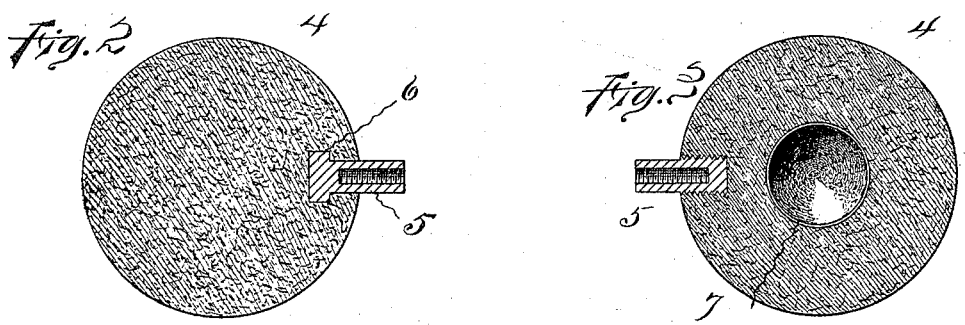
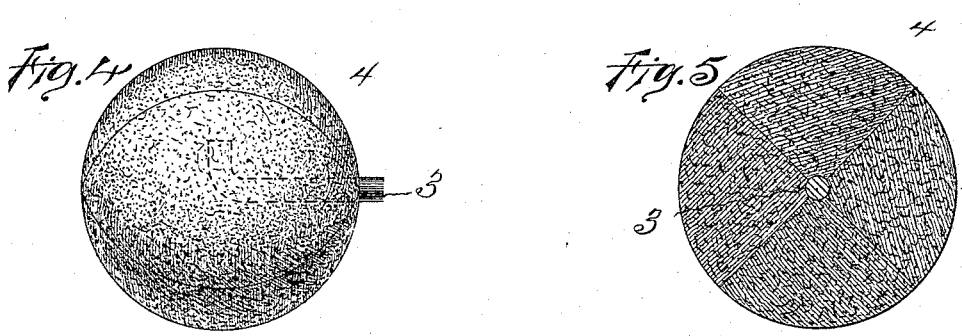

FREDERICK C. ROCKWELL, OF HARTFORD, CONNECTICUT.

FLOAT FOR BALL-COCKS.

SPECIFICATION forming part of Letters Patent No. 585,449, dated June 29, 1897.

Application filed February 7, 1896. Serial No. 578,389. (No model.)

*To all whom it may concern:*

Be it known that I, FREDERICK C. ROCKWELL, a citizen of the United States, residing at Hartford, in the county of Hartford and State of Connecticut, have invented certain new and useful Improvements in Floats for Ball-Cocks, of which the following is a specification.

The invention relates to the class of floats that are used in tanks or reservoirs for automatically operating the ball-cock or tank-supply valve according to the amount of water in the tank or reservoir, and thus keeping the water-supply always the same.

The object of the invention is to provide a float for this purpose which shall be simple and cheap to manufacture and durable in use, which shall be non-rustable and impervious to water, and which will be and will remain more light and buoyant than prior floats for this purpose, whereby a smaller float may be used to accomplish the required function, thus reducing the cost and allowing a smaller tank to be used and at the same time obtain a more satisfactory service.

Referring to the accompanying drawings, wherein the invention and its use are illustrated, Figure 1 is a sectional view of a tank with a ball-cock provided with one of the improved floats. Fig. 2 is an enlarged section of the float. Fig. 3 is a section of the float, showing a modified construction. Fig. 4 is a side view of the float constructed in another manner, and Fig. 5 is a section of the float shown in Fig. 4.

In the views, 1 indicates a flushing or water-supply tank such as is used in lavatories and closets. This tank is shown as having a ball-cock or water-supply valve 2 of common construction on one edge, which cock has a common float-rod 3, on the end of which is the float 4. The float rises and falls with the level of the water and oscillates the rod so that it moves the valve parts to admit or shut off the water-supply, as usual. Previously these floats have been made of a piece of natural cork of the proper size and suitable shape, a block of wood, or sheet metal, as iron, brass, tin, zinc, or copper, in the form of a hollow box, drum, or sphere. The prior natural cork pieces in order to have the proper weight to open the valve when the water-level is lowered and the proper buoyancy to close the valve when the level of the water is sufficiently high had of necessity to be made of considerable size, which was inconvenient, as it occupied much of the space in a small tank, and this was also expensive. This natural cork when left in the water became soaked and water-logged after a little use and did not satisfactorily open and close the valve, and thus was not practicable for the purpose required. The wooden blocks used as floats had also to be of considerable size to insure proper buoyancy and they soon became water-logged and valueless to perform their functions properly. The metal floats are of necessity of considerable size to secure buoyancy, and being in the form of spheres are somewhat expensive to manufacture. If these metallic floats are made from very cheap metal, as iron or tin, after short use they are liable to rust to such an extent as to be useless, and if better material, as zinc, brass, or copper, is used they are expensive and are besides liable to corrode when used in tanks supplied with the impure waters of certain localities. Furthermore, these thin sheet-metal floats are liable to become battered and disfigured while being transported and handled when being put to use.

In the manufacture of the float 4 of the present invention broken or ground particles of cork, such as the cheap refuse of stopper and other cork factories, are first treated with gum which is insoluble in water. This can be accomplished by mixing the cork particles in liquid shellac or by spraying the cork particles with shellac until they are thoroughly coated with this gum. After these gum-coated particles, which are now, of course, impervious to water, are thoroughly dried they are placed in a mold and subjected to heat and pressure until they are set in the form desired, which may be the completed sphere, as shown in Figs. 2 and 3, or may be in the sections or segments of the sphere or other shape, as shown in Figs. 4 and 5. If the pieces shaped are in the form of segments, these segments may be cemented together by any suitable waterproof cement or may be again placed in molds and subjected to heat and pressure, so as to unite them into a homogeneous mass of the size and shape of the finished float. The heat and pressure of course compacts the gum-coated particles of cork and hardens and sets the gum in such manner as to make the finished float even more impervious to water than the treated particles are before being compressed.

For the attachment of the float-rod that connects the valve with the float a nipple 5, having a threaded socket for the threaded end of the rod, may be placed in the mold and the material molded and compacted around its enlarged head 6, so that the nipple cannot be removed from place or work loose after the float has been pressed to shape. This nipple may be made in the form shown in Fig. 3, or, if preferred, the end of the float-rod 3 may be placed in the mold and the material molded about it. This construction can be readily performed when the float is made in sections or segments, as shown in Figs. 4 and 5, when the float-rod will lie between the sections, with its end bent out to prevent removal. If desired, an inner central metallic sphere 7 may be provided and the waterproof gum-coated particles molded about this central sphere, as shown in Fig. 3.

The float of this invention constructed in this manner is very buoyant. It can be made light or heavy, as desired, according to the amount of gum and pressure utilized in forming the float to shape. It can be made small, so that it can be used in a small tank without occupying too much space. It is cheap, for the cork particles are very inexpensive and the treatment and process to which they are subjected in making the float are simple to perform, and the float is durable, for it does not rust or corrode, and as it is impervious to water it cannot soak or become water-logged during any time of use, and, furthermore, a float constructed in this manner cannot be battered or jammed out of shape during transportation or by ordinary handling when it is being put to use.

I claim as my invention—

1. As a new article of manufacture, a float for a ball-cock consisting of a number of homogeneously-united sections formed of shellac-coated compressed broken particles of cork that were heated while being compressed, and a rod attachment with one end embedded within the sections, substantially as specified.

2. The process of making floats for ball-cocks which consists in coating broken particles of cork with shellac, subjecting masses of these shellac-coated particles of cork to heat and pressure and forming them into sections, then uniting these sections of heated and compressed broken particles of cork and shellac into a homogeneous mass under heavy pressure, substantially as specified.

FREDERICK C. ROCKWELL.

Witnesses:
H. R. WILLIAMS,
E. J. HYDE.